US 6,697,364 B1

(12) United States Patent
Kekki et al.

(10) Patent No.: US 6,697,364 B1
(45) Date of Patent: Feb. 24, 2004

(54) STATISTICAL MULTIPLEXING IN A TELECOMMUNICATIONS NETWORK

(75) Inventors: Sami Kekki, Helsinki (FI); Jyri Suvanen, Helsinki (FI)

(73) Assignee: Nokia Corporation, Espoo (FI)

( * ) Notice: Subject to any disclaimer, the term of this patent is extended or adjusted under 35 U.S.C. 154(b) by 435 days.

(21) Appl. No.: 09/616,313

(22) Filed: Jul. 17, 2000

Related U.S. Application Data

(63) Continuation of application No. PCT/FI99/00053, filed on Jan. 28, 1999.

(30) Foreign Application Priority Data

Jan. 28, 1998 (FI) .................................. 980189

(51) Int. Cl.$^7$ ............................ H04J 3/02; H04J 3/16
(52) U.S. Cl. ................. 370/389; 370/471; 370/474; 370/535; 714/749
(58) Field of Search ................. 370/389, 395.01, 370/431, 433, 465, 468, 470, 471, 474, 535; 714/746, 748, 749

(56) References Cited

U.S. PATENT DOCUMENTS

| 4,082,922 | A | * | 4/1978 | Chu ..................... 179/15 BA |
| 4,494,232 | A | * | 1/1985 | Dambrackas et al. ......... 370/80 |
| 4,700,341 | A | * | 10/1987 | Huang ......................... 370/80 |
| 5,153,876 | A | * | 10/1992 | Sin ........................... 370/85.1 |
| 5,675,642 | A | * | 10/1997 | Sone ........................... 370/389 |
| 5,699,356 | A |   | 12/1997 | Beever et al. ............... 370/329 |
| 5,768,265 | A | * | 6/1998 | Toyohara ..................... 370/282 |
| 6,229,821 | B1 | * | 5/2001 | Bharucha et al. .......... 370/471 |

FOREIGN PATENT DOCUMENTS

| EP | 0407 367 A3 | 1/1991 |
| WO | WO 96/35299 | 11/1996 |
| WO | WO 97/48200 | 12/1997 |

OTHER PUBLICATIONS

International Search Report for PCT/FI99/00053.
M. Mouly & M. Pautet, "The GSM System for Mobile Communications", Palaiseau, France, 1992, ISBN:2–9507190–0–7.

* cited by examiner

Primary Examiner—Alpus H. Hsu
(74) Attorney, Agent, or Firm—Squire, Sanders & Dempsey L.L.P.

(57) ABSTRACT

A method carries out statistical multiplexing in a telecommunications network comprising a transmitting unit for transferring channels containing information from at least two traffic sources, a receiving unit and a transmission link between them. The information to be transmitted in the telecommunication system is transferred over the transmission link in transmission frames. The method is characterized by assembling a variable-length transmission frame comprising an allocation field and an information field, identifying an active channel, allocating an information field transmission block from the transmission frame to the active channel's information to be transferred, inserting the information to be transferred into the allocated transmission block, adding the channel allocation information into the allocation field of the transmission frame in which the channel's information is for the first time continuously transferred, maintaining the channel's allocation for as long as the channel is continuously active, and transmitting the transmission frame to the receiving unit.

20 Claims, 10 Drawing Sheets

| octet number | bit number | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | X | X | X | X | X | X | X |
| 5 | X | X | X | X | X | X | X | X |
| 6 | 1 | X | X | X | X | X | X | X |
| 7 | X | X | X | X | X | X | X | X |
| 8 | 1 | X | X | X | X | X | X | X |
| 9 | X | X | X | X | X | X | X | X |
| 10 | 1 | X | X | X | X | X | X | X |
| 11 | X | X | X | X | X | X | X | X |
| 12 | 1 | X | X | X | X | X | X | X |
| 13 | X | X | X | X | X | X | X | X |
| 14 | 1 | X | X | X | X | X | X | X |
| 15 | X | X | X | X | X | X | X | X |
| 16 | 1 | X | X | X | X | X | X | X |
| 17 | X | X | X | X | X | X | X | X |
| 18 | 1 | X | X | X | X | X | X | X |
| 19 | X | X | X | X | X | X | X | X |
| 20 | 1 | X | X | X | X | X | X | X |
| 21 | X | X | X | X | X | X | X | X |
| 22 | 1 | X | X | X | X | X | X | X |
| 23 | X | X | X | X | X | X | X | X |
| 24 | 1 | X | X | X | X | X | X | X |
| 25 | X | X | X | X | X | X | X | X |
| 26 | 1 | X | X | X | X | X | X | X |
| 27 | X | X | X | X | X | X | X | X |
| 28 | 1 | X | X | X | X | X | X | X |
| 29 | X | X | X | X | X | X | X | X |
| 30 | 1 | X | X | X | X | X | X | X |
| 31 | X | X | X | X | X | X | X | X |
| 32 | 1 | X | X | X | X | X | X | X |
| 33 | X | X | X | X | X | X | X | X |
| 34 | 1 | X | X | X | X | X | X | X |
| 35 | X | X | X | X | X | X | X | X |
| 36 | 1 | X | X | X | X | X | X | X |
| 37 | X | X | X | X | X | X | X | X |
| 38 | 1 | X | X | X | X | X | C16 | C17 |
| 39 | C18 | C19 | C20 | C21 | T1 | T2 | T3 | T4 |

Fig. 2

| octet number | bit number | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | 1 | 1 | 1 | 1 | 1 | 1 | 1 |
| 5 | 1 | 1 | 1 | 1 | 1 | 1 | 1 | 1 |
| 6 | 1 | 1 | 1 | 1 | 1 | 1 | 1 | 1 |
| 7 | 1 | 1 | 1 | 1 | 1 | 1 | 1 | 1 |
| 8 | 1 | 1 | 1 | 1 | 1 | 1 | 1 | 1 |
| 9 | 1 | 1 | 1 | 1 | 1 | 1 | 1 | 1 |
| 10 | 1 | 1 | 1 | 1 | 1 | 1 | 1 | 1 |
| 11 | 1 | 1 | 1 | 1 | 1 | 1 | 1 | 1 |
| 12 | 1 | 1 | 1 | 1 | 1 | 1 | 1 | 1 |
| 13 | 1 | 1 | 1 | 1 | 1 | 1 | 1 | 1 |
| 14 | 1 | 1 | 1 | 1 | 1 | 1 | 1 | 1 |
| 15 | 1 | 1 | 1 | 1 | 1 | 1 | 1 | 1 |
| 16 | 1 | 1 | 1 | 1 | 1 | 1 | 1 | 1 |
| 17 | 1 | 1 | 1 | 1 | 1 | 1 | 1 | 1 |
| 18 | 1 | 1 | 1 | 1 | 1 | 1 | 1 | 1 |
| 19 | 1 | 1 | 1 | 1 | 1 | 1 | 1 | 1 |
| 20 | 1 | 1 | 1 | 1 | 1 | 1 | 1 | 1 |
| 21 | 1 | 1 | 1 | 1 | 1 | 1 | 1 | 1 |
| 22 | 1 | 1 | 1 | 1 | 1 | 1 | 1 | 1 |
| 23 | 1 | 1 | 1 | 1 | 1 | 1 | 1 | 1 |
| 24 | 1 | 1 | 1 | 1 | 1 | 1 | 1 | 1 |
| 25 | 1 | 1 | 1 | 1 | 1 | 1 | 1 | 1 |
| 26 | 1 | 1 | 1 | 1 | 1 | 1 | 1 | 1 |
| 27 | 1 | 1 | 1 | 1 | 1 | 1 | 1 | 1 |
| 28 | 1 | 1 | 1 | 1 | 1 | 1 | 1 | 1 |
| 29 | 1 | 1 | 1 | 1 | 1 | 1 | 1 | 1 |
| 30 | 1 | 1 | 1 | 1 | 1 | 1 | 1 | 1 |
| 31 | 1 | 1 | 1 | 1 | 1 | 1 | 1 | 1 |
| 32 | 1 | 1 | 1 | 1 | 1 | 1 | 1 | 1 |
| 33 | 1 | 1 | 1 | 1 | 1 | 1 | 1 | 1 |
| 34 | 1 | 1 | 1 | 1 | 1 | 1 | 1 | 1 |
| 35 | 1 | 1 | 1 | 1 | 1 | 1 | 1 | 1 |
| 36 | 1 | 1 | 1 | 1 | 1 | 1 | 1 | 1 |
| 37 | 1 | 1 | 1 | 1 | 1 | 1 | 1 | 1 |
| 38 | 1 | 1 | 1 | 1 | 1 | 1 | C16 | C17 |
| 39 | C18 | C19 | C20 | C21 | T1 | T2 | T3 | T4 |

| octet number | bit number | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | CH1 | CH1 | CH2 | CH2 | X | X | X | X |
| 2 | X | X | X | X | X | X | X | X |
| 3 | X | X | X | X | X | X | X | X |
| 4 | X | X | X | X | X | X | X | X |
| 5 | X | X | X | X | X | X | X | X |
| 6 | X | X | X | X | X | X | X | X |
| 7 | X | X | X | X | X | X | X | X |
| 8 | X | X | X | X | X | X | X | X |
| 9 | X | X | X | X | X | X | X | X |
| 10 | X | X | X | X | X | X | X | X |
| ⋮ | | | | | | | | |
| 29 | X | X | X | X | X | X | X | X |
| 30 | X | X | X | X | X | X | X | X |
| 31 | X | X | X | X | X | X | X | X |

US 6,697,364 B1

STATISTICAL MULTIPLEXING IN A TELECOMMUNICATIONS NETWORK

This application is a continuation of PCT/FI99/00053 filed Jan. 28, 1999.

FIELD OF THE INVENTION

The invention relates to statistical multiplexing in a telecommunications network, as well as a statistical multiplexer, and statistical demultiplexer.

TECHNICAL BACKGROUND

FIG. 1 in the accompanying drawings shows a simplified block diagram of GSM mobile communication system (GSM. Global System for Mobile Telecommunications). The network subsystem (NSS) comprises a mobile services switching centre MSC which communicates with other mobile services switching centres, and either directly or via the system interface of a gateway mobile services switching centre (GMSC), the mobile communication system is connected to other networks, such as the public switched telephone network (PSTN), an integrated services digital network (ISDN), other mobile communication networks such as the public land mobile network (PLMN) and packet-swztched public data networks (PSPDN) and cir-cuitswitched public data networks (CSPDN). The mobile services swishing centre comprises network interworking functions (IWF) by means of which the GSM network can be adapted to other networks. The network subsystem NSS is connected via the A interface to the base station subsystem (BSS) which comprises base station controllers BSC, each controlling base stations BTS that are connected to them. The interface between the BSC and base stations BTS connected thereto is the A bis interface.Base stations BTS for their part communicate on the radio path with mobile stations MS over the radio interface. The operation of the entire system is monitored by an Operation and Maintenance Centre, OMC.

The transcoder/rate adaptor unit (TRAU) is a part of the base station subsystem BSS and may be located at the base station controller BSC, as shown in FIG. 1, or alternatively at the mobile services switching centre MSC. The transcoders convert speech from a digital format to another, for example 64 kbit/s PCM received over the A interface from the MSC, into data to be transmitted to the base station, and vice versa. One 64 kbit/s PCM channel carries four speech/data connections, which means that the rate of one speech/data channel on this link is 16 kbit/s.

The mobile station MS transmits user data over the radio interface on the radio channel at 13 kbit/s or 5.6 kbit/s, as specified in the standard. The base station BTS receives the data of the traffic channel and transfers it to the 64 kbit/s timeslot of the PCM circuit In addition, the three other traffic channels of the same carrier are inserted into the same timeslot, i.e. channel, resulting in that the transfer rate per connection is 16 kbit/s. At the BSC, the TRAU converts the coded 16 kbit/s digital information into the 64 kbit/s channel, and on this channel the data is transferred into the IWF unit at the MSC. The IWF carries out the necessary modulation and rate adaptation, after which the data is transmitted to some other network. Thus, user data is transferred over fixed connections in the uplink direction from the BTS to the BSC and the MSC, and correspondingly, the data to be transmitted to the MS is transferred in the downlink direction from the MSC via the BSC to the BTS and from thereon over the radio interface to the MS. The channel codec unit (CCU) of the base station carries out the conversion of the signal received on the radio channel into the channel of the PCM time slot in the trunk circuit over the A bis interface, and the conversion of the signal received over the A bis interface into the form transmitted to the radio path. The TRAU carries out the conversion operations for the signals to be transferred over the A interface.

The user data is transferred over the A bis interface from the BTS to the TRAU in a fixed-length TRAU frame. FIG. 2 shows in bit diagram form a TRAU data frame used to transfer a signal at the data rate of 13 kbit/s. The TRAU frame comprises 40 octets numbered 0, . . . , 39, its total length thus being 320 bits and duration 20 ms. Synchronization between the unit that transmits the TRAU frame and the one that receives it is achieved with synchronization bits that are shown in FIG. 2 as 0 bits and 1 bits. The 0 bits in the first two octets of the TRAU speech frame are used for carrying out the actual synchronization, and the 1 bits in the first bit position in the other even octets except the second and fourth, are used to ensure that elsewhere in the data frame there are no two-octet-long sequences of successive 0 bits that would look like a synchronization sequence. One TRAU speech frame contains 35 synchronization bits per the total number of 320 bits. The TRAU frame of FIG. 2 shows control bits C1–C21, timing bits T1–T4 and the user data bits denoted with X. Unused data bits are set to 1-state, for example, for the duration of breaks in the data transmission, whereby the TRAU frame to be transferred is in accordance with the idle speech frame of FIG. 3. The BFI control bit (Bad Frame Indicator) in the idle frame is used to indicate that the frame does not contain speech information.

The bits in the TRAU frames are normally transferred over the PCM line in a PCM frame according to ITU-T Recommendation G.704, whose structure is shown in FIG. 4. The frame comprises 32 octets numbered 0, . . . , 31. The frame duration with the transfer rate of 2 Mbit/s is 125 μs. The 0-bits of the first octet are the frame synchronization. CH1, CH2 and X-bits marked in FIG. 4 comprise the bits to be transferred from different TRAU frames, so that at the transfer rate of 8 kbit/s the bit to be transferred from each TRAU frame i.e. channel is inserted into one bit position in the PCM frame, and at the transfer rate of 16 kbit/s user data bits of the TRAU frame are inserted into two bit positions in the PCM frame. FIG. 4 shows a PCM frame with the transfer rate of 16 kbit/s as regards the transfer of channels CH1 and CH2.

In the GSM system, the transmission of bit streams from different sources is enhanced e.g. by means of multiplexing and concentrator equipment. The bit steams are interleaved to e.g. 2 Mbit/s buses with TDM (Time Division Multiplex) so that each channel in the system is allocated a dedicated timeslot, which the channel always uses.

Discontinuous transmission (DTX) refers to a method in which the mobile station's transmission to the radio path may be interrupted for the duration of pauses in speech. The aim is to reduce the power consumption of the mobile station, a very significant issue for it. In the GSM system, for example, the speech activity of the signal transmitted from the mobile station to the bas station is monitored at the mobile station, and if no speech information exists, the mobile station's transmission to the radio path is cut. When the mobile station's MS transmission has been discontinued, the base station BTS generates idle frames according to FIG. 3 and transmits them forward to the base station controller BSC. When speech again begins, it is coded at the mobile station and transmitted to the base station in the correct timeslot. In order for the receiving party not to sense the transmission cut as unpleasant total silence, comfort noise parameters (SID, Silence Descriptor) are transmitted to the base station at specific intervals, 0.5 s in the GSM system, which are used to generate comfort noise simulating background noise in the speech decoder.

The contents of the user bits in the TRAU frame are indicated with the aid of control bits. In the uplink direction, control bits C13 and C14 in the BFI, SID and TAF (Time Alignment Flag) flags in the TRAU frame are used to indicate whether the TRAU frame to be transferred contains speech or SID comfort noise parameters. In the idle TRAU frame according to FIG. 3, these control bits are employed to indicate that the frame does not contain payload. Correspondingly in the downlink direction, control bit C16 in the TRAU frame according to FIG. 2 is used to indicate whether the TRAU frame to be transferred contains speech (SP=1) or something else than speech information (SP=0).

The problem with the prior art speech transfer described above is that useless information is transferred in it, for example idle TRAU speech frames during pauses in speech, which leads to transfer capacity being wasted. Due to the fixed channel allocation of TDM (Time Division Multiplexing), the channel is continuously reserved for use by one traffic source regardless of the actual demand for transfer capacity of said traffic source. Because in speech traffic the subscribers as a general rule speak alternately, and because the speaking party will have irregular pauses when talking, the efficiency of the reserved channel is roughly less than 50% of the duration of the call. Particularly when connecting the traffic of several base stations to the same bus the average efficiency of the bus is a mere 30% of the theoretical maximum utilization degree because calls are often set up at different times, which means that only part of the channels on the bus are used simultaneously. With the prior art transfer, additional problems are caused by redundancy in the transfer of synchronization bits, caused by channel-specific synchronization of the TRAU frame structure when 35 synchronization bits are transferred in each TRAU frame.

SUMMARY OF THE INVENTION

The aim of this invention is to enhance data transfer so that more payload can be transferred with low transfer capacity than previously.

The object is achieved with the inventive method, characterized by that which is claimed in the independent claim 1. The preferred embodiments of the invention are disclosed in the dependent claims 2–11.

The invention additionally relates to a statistical multiplexer, a statistical demultiplexer and a transmission frame which are characterized by that which is claimed in the independent claims 12, and 16. The preferred embodiments of the invention are disclosed in the dependent claims.

The invention is based on the idea that statistical multiplexing is employed to assign bus capacity only for the active channels. In this process, the bits of the active channels are placed into the transmission blocks of a variable-length transmission frame and sufficient identification data is added to the frame. The multiplexer sends this inventive transmission frame to the transmission bus whose capacity is advantageously in the exclusive use of the frame in question. On the transmission link, the frame is routed in the network nodes to the correct terminal node, in which the bits in the frame are demultiplexed to their respective channels on the basis of the identification data. In other words, the inventive statistical multiplexing transfers the bits from a prior art regular frame structure to the inventive variable-length transmission frame for the duration of the transfer, and back to the regular transmission frame at the receiving end. Additionally, information transfer is further enhanced in the particular embodiments of the invention, by minimizing the number of bits to be transferred by e.g. removing unnecessary synchronization bits and/or control bits, and possibly by compressing the assembled transmission frame prior to transfer.

Such statistical multiplexing provides the advantage that channel allocation is extremely dynamic, resulting in lower data transfer capacity and, secondly, the assigned capacity being brought into more efficient use. By assigning data transfer capacity for use by data transfer of the active channels, only, temporally-interleaved signals can be inserted in the same transmission block. With the inventive statistical multiplexing, the operator is able to add capacity to its network without further investments in transmission lines when e.g. more TRXs can be connected to one 2 Mbit/s transmission line than previously.

BRIEF DESCRIPTION OF THE DRAWINGS

The invention will below be described in connection with the preferred embodiments, with reference to examples in FIGS. 5–13 in the accompanying drawings, in which.

FIG. 2 shows the structure of a TRAU frame;

FIG. 3 shows the structure of an idle TRAU frame;

FIG. 4 shows the structure of a PCM frame;

DETAILED DESCRIPTION OF THE INVENTION

Figure 1:
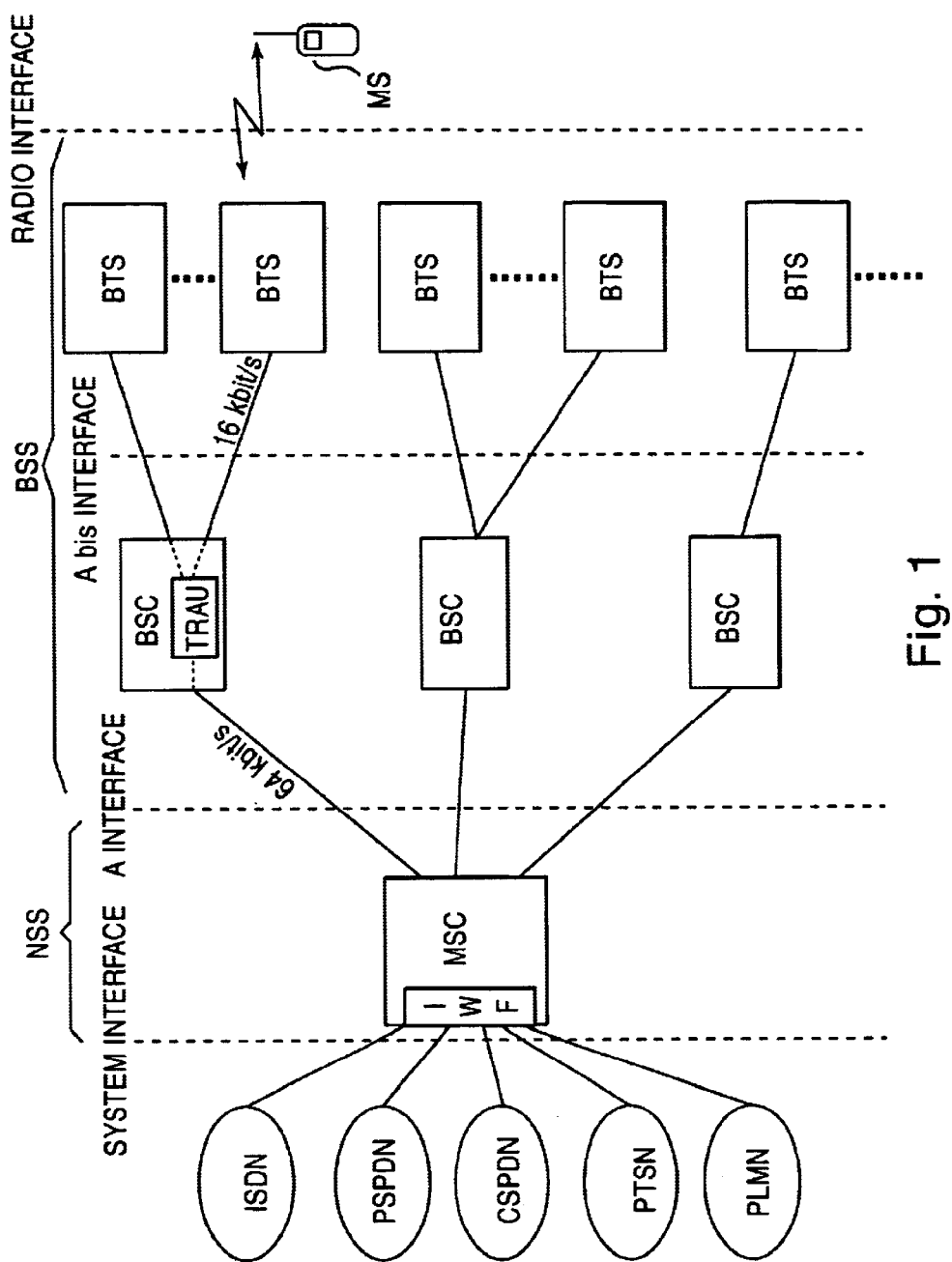
FIG. 1 shows the essential parts of a mobile communications network from the invention's point of view.

The present invention can be applied in connection with any communications network. Below, the invention is described by way of example mainly in connection with the digital GSM mobile communications system. FIG. 1 shows the simplified structure of the GSM network, described above. For a more detailed description of the GSM system, reference is made to the GSM Recommendations and "The GSM System for Mobile Communications", M: Mouly & M. Pautet, Palaiseau, France, 1992, ISBN:2-9507190-0-7.

A transmission frame assembled according to the present invention will in this application be referred to as an SMF frame (Statistical Multiplexing Frame). The channel-specific data block carried in the SMF frame is termed a subframe. The structure of the SMF frame will be described in greater detail below.

Figure 5:
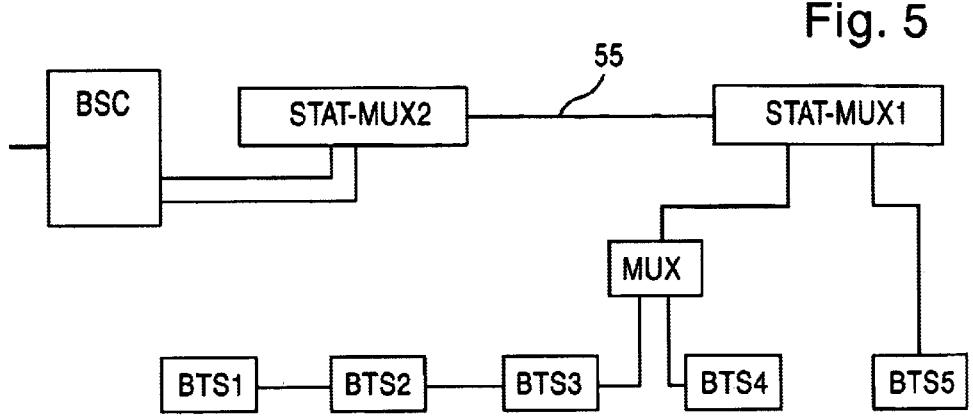
FIG. 5 shows a first exemplary structure of the inventive statistical multiplexing arrangement as a block diagram.

FIG. 5 shows the structure of an inventive statistical multiplexing arrangement as a block diagram. The inventive statistical multiplexes STAT-MUXn illustrated in the figures of this application comprise both a statistical multiplexer for carrying out mutiplexing and a demultiplexer for disassembling the multiplexing. In accordance with prior art, FIG. 5 shows the traffic of base stations BTS1–BTS3 being combined into a common bus and the traffic of this bus being concentrated with the traffic of base station BTS in a prior art multiplexer MUX. According to the present invention, the traffic of base station BTS5 and the concentrated traffic from multiplexer MUX are applied to the inventive multiplexer STAT-MUX1, which performs the inventive statistical multiplexing for the traffic and transmits the bits in an inventive SMF frame to the inventive statistical demultiplexer STAT-MUX2 over transmission link 55. In the GSM system, transmission link 55 travels across the A bis interface. The statistical demultiplexer STAT-MUX2 at the receiving end demultiplexes the information carried in the SMF frame into a prior art fixed-length frame, e.g. into a PCM frame that is forwarded to the base station controller BSC. Correspondingly, the traffic sent from the BSC to the base stations is statistically demultiplexed according to the invention in statistical demultiplexer STAT-MUX2 which transmits the bits to statistical demultiplexer STAT-MUX1 in an SMF frame over transmission link 55. In STAT-MUX1, the information in the transmission frame is demultiplexed into a prior art fixed-length frame, such as a PCM frame. This prior art frame is passed on, according to prior art, to the base stations. Transmission link 55 and the base station connections of statistical multiplexer STAT-MUX1 are 2 Mbit/s transmission lines, for example.

Figure 6:
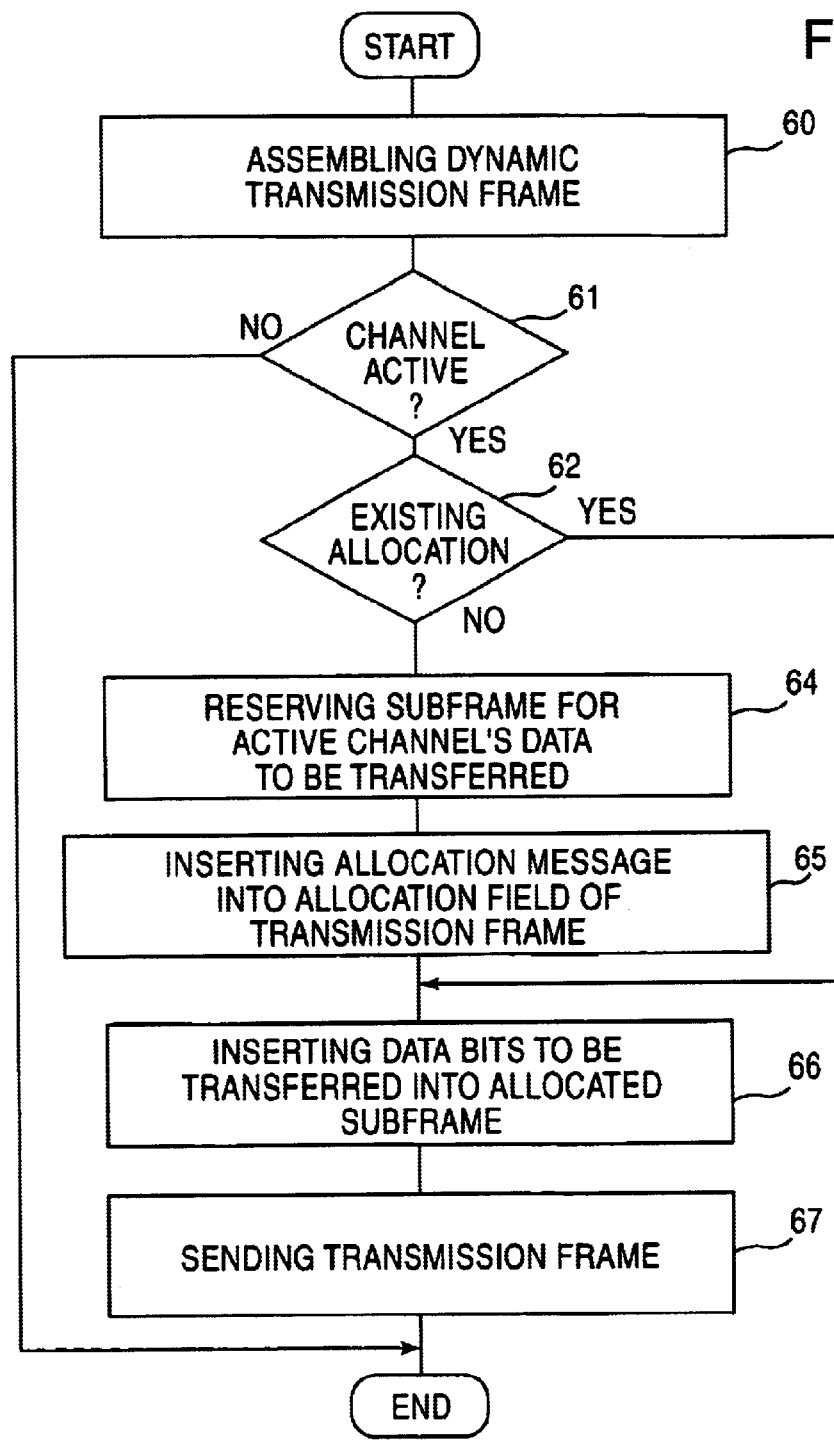
FIG. 6 shows the first embodiment of the inventive statistical multiplexing as a flow chart.

In the following, the invention will be described in closer detail in the light of its preferred embodiment with reference to FIG. 6. In the preferred embodiment of the invention, the radio link uses discontinuous transmission (DTX) in the uplink and/or downlink direction. FIG. 6 shows the inventive method for one active channel. At step 60 in FIG. 6, the inventive dynamic variable-length SMF frame is formed In a statistical multiplexer, in the case of FIG. 6 e.g. in multiplexer STA-MUX1. Based on the information of the channel which was received by the statistical multiplexer and which is meant to be transferred over the A bis interface, it is monitored at step 61 whether the channel in question is active, e.g. on the basis of the information contents indicated by the control bits in the TRAU frame. The channels that carry speech information and, secondly, SID comfort noise parameters are interpreted as active channels, but not the channels that carry idle speech frames, such as TRAU idle speech frames according to FIG. 3. After identifying an active channel, it is checked at step 62 whether the channel already has an existing allocation in the SMF frame. The allocations are not actually removed for the duration of speech pauses, but the channel may have been assigned for use by another active channel during the pause. If the channel does not have an existing allocation, a subframe is allocated from the SMF frame formed at step 64, i.e. a data transmission block, for transfer of the active channel's information. The information of the channel in question has not been transferred in the previous transmitted SMF frame, but the allocation for the information is new. In the case of this new allocation, an allocation message is inserted into the allocation field of the SMF frame at step 65 of FIG. 6. In the allocation message is indicated the identification data of the subframe used for data transmission of the channel in question. At step 66, the active channel bits are inserted into the allocated subframe. Correspondingly, bits of other active channels are inserted into the other subframes of the SMF frame. If the channel has a previous existing allocation for the SMF frame, a move is made from step 62 directly to step 66. In the case of a previous allocation, for example, if uninterrupted activity on the channel continues, the bits in turn for transfer are inserted into the same subframe allocated from the SMF frame as in the previous SMF frame. In such a case, no allocation message is transmitted in the allocation field of the SMF frame as regards the allocation of this channel, because the receiving end knows about the allocation or the basis of the allocation message sent in the previous SMF frame. At step 67 in FIG. 6, the SMF frame thus formed is transmitted to the transmission line, to transmission line 55 in the case of FIG. 5. For the next SMF frame, the functionality of the FIG. 6 flow-chart begins from the top by forming a new SMF frame at step The insertion of the active channel's information into the subframes reserved for this purpose in each SMF frame is continued until the channel is no longer active, for example when the channel carries an idle speech frame that is not forwarded according to the invention. When the channel reactivates, information transmission may be continued in the same subframe of the SMF frame in case the subframe has not been allocated to another active channel during the transmission pause. In such a case, too, a move is made from step 62 in FIG. 6 directly to step 66. During the pauses in speech, idle TRAU frames that were not transmitted are, if need be, generated in the receiving unit in a way to be described more closely below.

Figure 7:
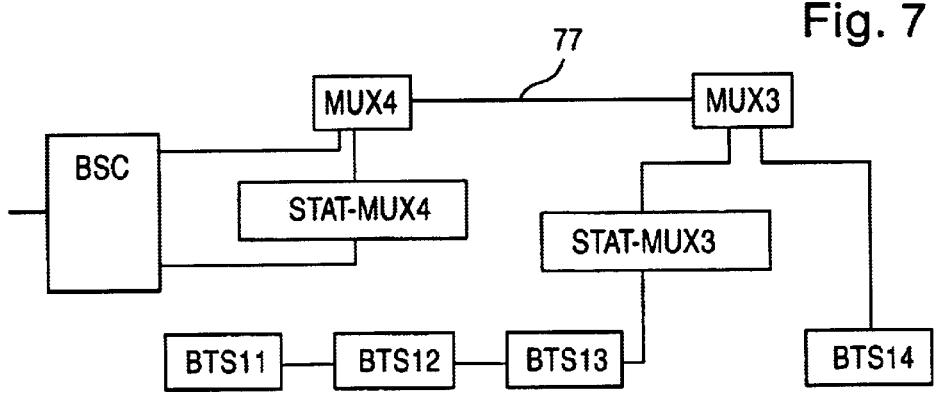
FIG. 7 shows a second exemplary structure of the inventive statistical multiplexing arrangement as a block diagram.

FIG. 7 shows another network arrangement to implement the inventive statistical multiplexing. In the exemplary case of FIG. 7, statistical multiplexer STAT-MUX3 inserts bit streams from three base stations BTS11–BTS13 connected to the same transmission bus into an inventive SMF frame. Prior art multiplexer MUX3 concentrates traffic received from base station BTS14 and statistical multiplexer STAT-MUX3 according to prior art, and transfers data thus multiplexed over transmission link 77 to prior art demultiplexer MUX4. After carrying out demultiplexing, MUX4 transfers the inventive SMF frame to statistical demultiplexer STAT-MUX4 and the other frames directly to the base station controller BSC. Statistical demultiplexer STAT-MUX4 inserts the transmitted bits from the SMF frame to a prior art fixed-length frame, such as a PCM frame, and forwards this frame to the BSC. Correspondingly, information from base station-controller BSC to base stations BTS11–BTS13 is transferred statistically multiplexed by means of statistical multiplexer STAT-MUX4 in an SMF frame via multiplexer MUX, transmission link 77, and demultiplexer MUX3 to statistical multiplexer STAT-MUX3, which inserts the bits of the SMF frame to a prior art frame for forwarding to base stations BTS11–BTS13. Transmission link 77 Is, e.g., a 2 Mbit/s transmission line, and the connection between STAT-MUX3 and MUX3 is, e.g., an n*64 kbit/s transmission line.

In the second embodiment of the invention, a plurality of base stations BTS are connected to the statistical multiplexer, as is the case with base stations BTS11–BTS13 in FIG. 7. These base station connections are advantageously low-capacity transmission links. As calls are often set up at different times at different base stations, the inverted statistical multiplexing can be utilized by transmitting the calls of the base stations in the inventive SMF frame on a transmission bus that has lower data transfer capacity than that which would be required by simultaneous traffic via the base stations. In the following, the second embodiment of the invention will be described in more detail still referring to FIG. 6. In the second embodiment of the invention, the activity study of step 61 in FIG. 6 is carried out by monitoring ongoing calls, i.e. traffic activity, of the traffic transmitted by each base station, base stations BTS11–BTS13 in the case of FIG. 7. Each ongoing call is understood to constitute a channel of its own, whose transfer is continued as shown in FIG. 6 until the call is terminated. In other respects in the second embodiment of the invention, the SMF frame is formed the subframe is allocated, and the allocation message is transmitted in the first SMF frame as described in connection with the preferred embodiment of the invention.

In the preferred and second embodiments of the invention, the checking according to step 62 can be bypassed and a new subframe be always allocated for a new period of activity. In such a case, however, the capacity saving will be lost because the data transfer efficiency is greatly reduced as large part of the transfer capacity has to be allocated for transfer of allocation information.

The third embodiment of the invention combines the functionality of the preferred and second embodiments described above. This means that the third embodiment employs discontinuous transmission (DTX) in the uplink and/or downlink direction and the traffic of a plurality of base station is connected to the statistical multiplexer. In the third embodiment of the invention, then, the activity monitoring scheme at step 61 of FIG. 6 first involves monitoring the channel's activity according to the second embodiment of the invention, and additionally the speech activity of the channel with traffic activity according to the preferred embodiment of the invention. In the third embodiment, the discontinuous transmission function may be in use only on some channels, whereby speech pause monitoring according to the invention is carried out e.g. only for this channel, and, as to the other channels, only traffic activity is monitored.

Figure 8:
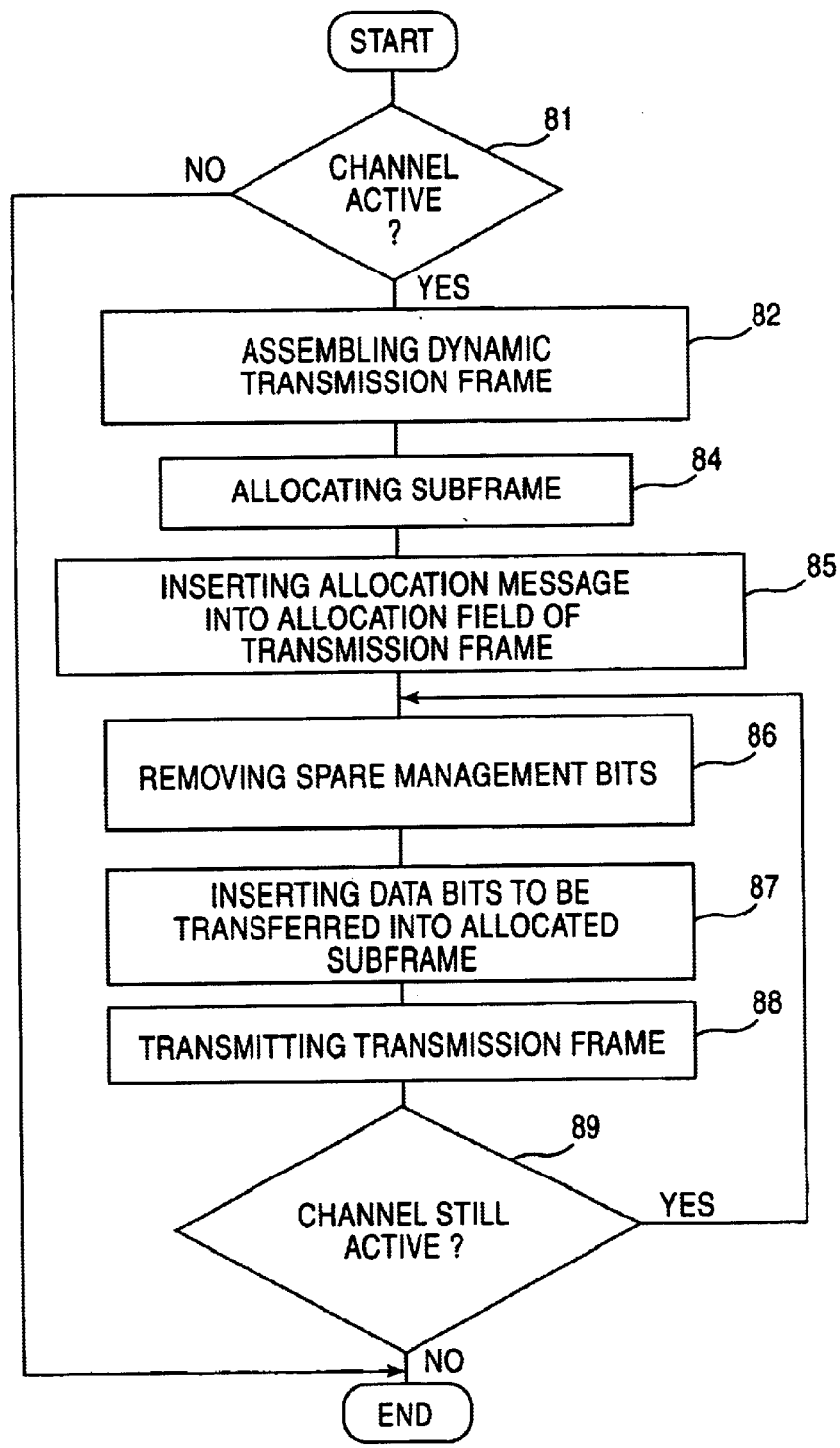
FIG. 8 shows the fourth embodiment of the inventive statistical multiplexing as a flow chart.

FIG. 8 shows the fourth embodiment of the inventive statistical multiplexing as a flow chart. In the fourth embodiment, extra management bits are removed from the bit stream to be transferred prior to inserting the bits into the inventive SMF frame. Extra management bits in this application refer to control bits and bits in the synchronization pattern, the unnecessary bit stream formed by which can be removed from among bits to be transferred. At step 81 of FIG. 8 it Is monitored whether the channel is active. This is done based on e.g. SID/speech activity and/or traffic activity, as described above in connection with the preferred, second and third embodiments of the invention. According to the invention, a dynamic SMF transmission frame is formed (step 82), from which a subframe is allocated to the active channels' bits to be transferred (step 84). The allocation message is placed into the allocation field of the assembled transmission frame (step 85) as described above in connection with the preferred embodiment of the invention. In the fourth embodiment, extra management bits are removed from the active channels' bits to be transferred, e.g. at least part of the synchronization bits and/or at least part of the control bits. In such a case, all or part of the synchronization bits in the TRAU frame of FIG. 2 are removed, whereby of the bits in the TRAU frame just the bits in the bit stream that remain after the bit removal are inserted into the inventive SMF frame (step 87 in FIG. 8). The transmission frame formed at step 88 of FIG. 8 is transmitted 10 the receiving party over the transmission link. The activity of the channel is checked at step 89, and the treatment according to steps 86–89 is repeated for the active channel. In the fourth embodiment of the invention, an existing allocation can be checked, too, as described in connection with the preferred embodiment with reference to step 62 in FIG. 6. The total or partial removal of synchronization bits and/or control bits is indicated to the receiving end, e.g. as an initial setting or within the allocation message, whereby the receiving statistical demultiplexer is able to generate the needed synchronization and/or control bits to the received bit stream. As a TRAU frame is known to begin from the beginning of the subframe of the SMF frame containing the channel allocation message, the synchronization bits can be added to the bit stream at the receiving end. Removal of all synchronization bits contributes to saving 35 bits per TRAU frame of the transfer capacity of the bus, i.e. approximately 11% of the transfer capacity. By removing spare C-bits, further capacity saving will be achieved. The synchronization of the data to be transferred by means of the SMF frame can, for the duration of the transfer, be replaced by a smaller synchronization pattern, which the statistical demultiplexer at the receiving end removes and generates in its stead synchronization bits required for transfer of a regular frame structure.

In the fifth embodiment of the invention, the formed SMF frame is compressed prior to sending it to the transmission bus. By means of compression, the data is further reduced, by e.g. compression according to recommendation V.42bis. Compression is applicable for use in connection with any of the embodiments described above.

Figure 9:
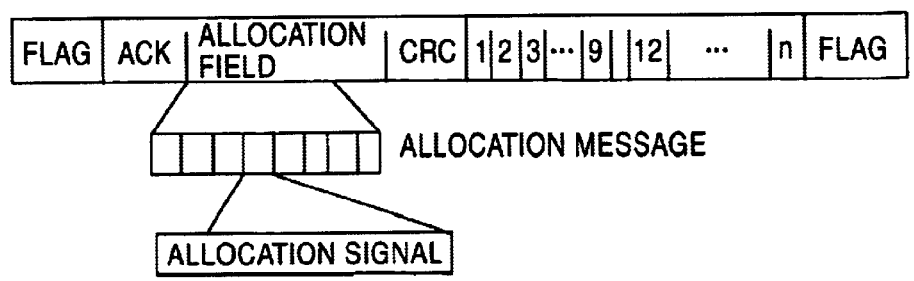
FIG. 9 shows the structure of the inventive transmission frame.

FIG. 9 shows an inventive transmission frame which is formed by a statistical multiplexer out of data on channels received e.g. in the form of a PCM frame. The formed SMF transmission frame is transmitted to the receiving end's statistical demultiplexer, which demultiplexes the frame structure used during the transfer an reinserts the data into a prior art regular frame, such as a PCM frame. The transfer blocks denoted with numbers 1, 2, . . . , n in FIG. 9 contain the actual payload being transferred. Therefore, most of the capacity of the frame is allocated to the payload. The numbered blocks correspond, depending on the configuration, to e.g. an 8 kbit/s or a 16 kbit/s channel.

The SMF frame of FIG. 9 comprises two frame flags, one at each end of the frame. The frame flags are needed to indicate the start and finish of a variable-length SMF frame. The frame length depends on the number of subframes transferred in it. Using the flag, the statistical multiplexer of the receiving unit synchronizes to the frame and is able to read it as intended.

To interpret the payload carried in the SMF frame, information on the structure of the frame, i.e. the positioning of the channels in the SMF frame, is transferred in the allocation field of the frame. Based on this control information, the statistical demultiplexer is able to insert the bits transferred in the frame to the correct position in e.g. a PCM frame. Allocation messages are placed into the allocation field of the SMF frame, which are possibly numbered with a modulo8 function (not shown in the figure), whereby it is possible to refer to allocation messages already sent in e.g. a fault situation. The allocation messages consist of messages of e.g. the form: 'channel number, transmission block number, transmission block number', which means that the transfer of channel 1 in blocks 3 and 9 would be expressed in the allocation message in the form: 'ch1; 3, 9'. From the allocation message, the channel number takes up one octet (8 bits), with which 256 different half-rate channels can be addressed. For addressing the transmission blocks of half-rate 8 kbit/s channels, a further octet is needed, and for full-rate channels as much as two octets, depending on the coding method. If the SMF frame is configured to 16 kbit/s transmission blocks, only, mere 7 bits are required to address the block. As an allocation message is only included into the SMF frame that starts the forwarding of subframes, a considerable capacity saving is achieved when compared to a situation where the channel number is attached to every subframe forwarded. The subframe allocations of an SMF frame may be independent in different transmission directions. If, however, the allocations are the same in both transmission directions, the allocation field is not necessarily required but for one transmission direction.

When an active speech period comes to an end, the channel allocation to the transmission blocks of the SMF frame does not necessarily last, if these allocated transmission blocks are needed for transfer of another active channel. In such a case, it is necessary to reallocate transmission blocks for the channel that has lost an allocation, e.g. for frames carrying SID comfort noise parameters according to the SACCH multiframe structure. Consequently, a plurality of allocation instances has to be transferred in the allocation field for the same channel, but only in the case of a number of activity periods.

The inventive statistical multiplexer must obtain unambiguous information on every subchannel carried in the SMF frame to be able to demultiplex the frame. Based on the information in the allocation message, each channel is inserted into the correct timeslot of the fixed-length frame, e.g. a PCM frame, in the demultiplexer. On the basis of the channel number transferred in the allocation message it is possible to deduct whether the channel is a signaling or traffic channel, and on the basis of allocated blocks, the capacity of the channel. In the allocation message, it is also possible to indicate removal of synchronization and/or control bits, whereby the demultiplexer can generate them. From the point of view of the receiving unit, the transmission blocks of the SMF frame are allocated to a specific channel until the transmitting unit sends a new allocation message in which they are allocated to another channel.

Figure 10:
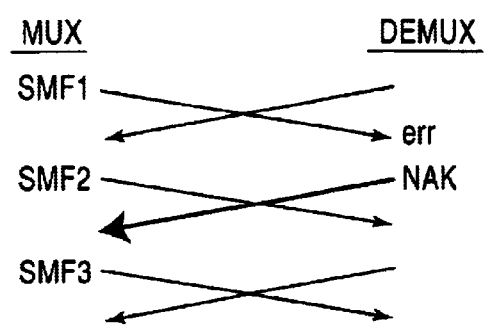
FIG. 10 shows an exemplary case of how a transmission error in an allocation message affects the transfer of SMF frames.

The allocation field's length is predetermined, and the information bits therein are advantageously protected, by e.g. CRC (Cyclic Redundancy Check), to detect possible transmission errors. On a transmission line of sufficient quality, the CRC procedure is not necessarily needed at all. The CRC check sum calculated from the allocation field bits is placed at the end of the allocation field, as shown e.g. in FIG. 9. The CRC procedure detecting a transmission error is advantageous, because in the allocation field, information is transmitted on the basis of which the statistical demultiplexer disassembles the SMF frame. Erroneous allocation information would result in erroneous channel disassembly from the SMF frame, and therefore confusion for the entire duration of the communication. To the return direction, information on possible CRC errors is transferred in the ACK field, located for example at the beginning of the allocation field, as shown by FIG. 9. The ACK bits, too, can be calculated to the CRC checksum. When the ACK field indicates a detected transfer error, the transmitting unit can resend the allocation messages of the corrupted allocation field, if they are still needed. The information of the corrupted allocation field is advantageously transmitted in the first possible SMF frame. The contents of the erroneous allocation message are not noted at the receiving end, but the SMF frame is demultiplexed on the basis of previous allocations. FIG. 10 shows as a signalling chart an SMF frame disassembly error caused by a corrupted allocation message. As a finite length of time is spent when the allocation messages contained in the corrupted allocation message are retransmitted, it is in the worst case possible to connect two TRAU subframes/channel to wrong bit positions into a fixed-length frame. e.g. a PCM frame according to G.704. The erroneous connecting naturally only concerns new allocations. The allocation message in the SMF1 frame of FIG. 10 is detected as having been corrupted during the transfer, whereby DEMUX sends information on the detected error to MUX in the ACK field, in the form of NAK (Negative Acknowledgement), for example. DEMUX demultiplexes the SMF1 frame on the basis of previous allocations. Prior to receiving the error information, MUX may hasten to send a new frame SMF2, which DEMUX still demultiplexes on the basis of previous allocations. It is not until SMF3 frame that MUX retransmits the allocation messages corrupted in the SMF1 frame. which means that DEMUX is able to correctly demultiplex the SMF frames from the reception of SMF3 on. To erroneously demultiplex two successive subframes of a channel into e.g. a PCM frame only causes some kind of disturbance in the traffic being forwarded, but as such does not endanger traffic transfer as a whole.

The maximum length of the SMF frame is limited by the available transfer capacity and repeat rate T1 at which the frame is transmitted. For example, if the interval between transmitting frames is T1=20 ms, the maximum length for the frame will be 39680 bits on a 2 Mbit/s bus, if the PCM frame timeslot 0 is allocated to synchronization bits according to G.704, as shown in FIG. 4. If T1 is e.g. 5 ms, the TRAU frame is transferred in four successive SMF frames The advantage of the inventive SMF frame is the small portion of identification information transferred in the frame in relation to the payload transmitted in the frame, which results in good transfer efficiency.

Figure 11:
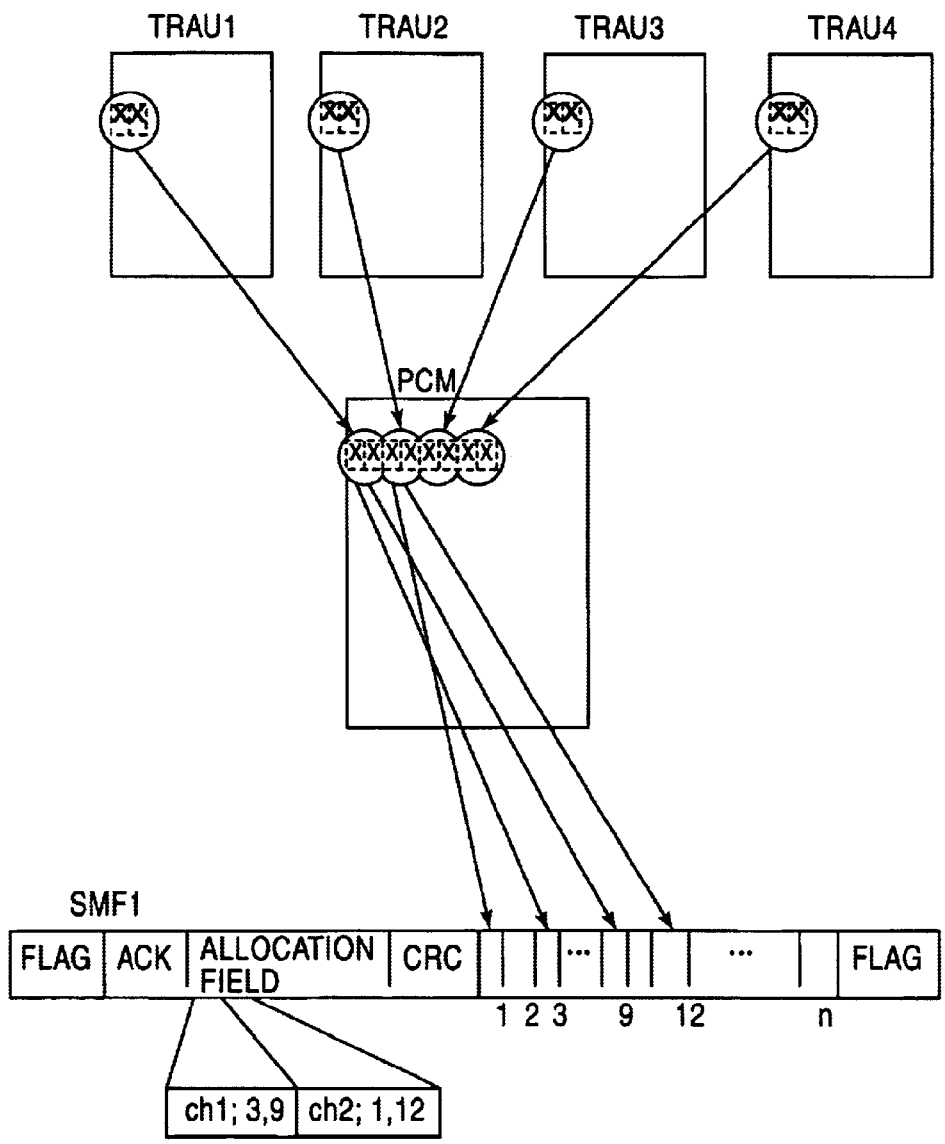
FIG. 11 shows an exemplary case of assembling the inventive transmission frame.

The following will describe in more detail the insertion of the payload into the inventive SMF frame and the associated allocation procedure, with reference to the example of FIG. 11. FIG. 11 illustrates transfer of 16 kbit/s information of four TRAU frames to a PCM frame and from there to the inventive SMF frame. Two bits from each TRAU1–TRAU4 frame are transferred to a PCM frame according to G.704, for example. Prior to transferring the bits from the PCM frame to the SMF1 frame, the inventive activity checking is carried out for each channel, as described above. In the example of FIG. 11, TRAU3 and TRAU4 frames are e.g. idle TRAU speech frames, whereby transmission blocks are allocated from the SMF1 frame only to the bits of the active channels' TRAU1 and TRAU2 frames In the inventive allocation procedure, a position from the SMF frame is allocated to the activated channel, in which the subframes belonging to the channel are transferred as such without identification information. The allocation information of this position is transferred over the transmission bus to the receiving unit in an allocation field of the SMF frame in which information from the activated channel is first transferred. In the allocation field, a plurality of allocations may be transferred in the allocation messages of the allocation message. Each active period on each channel is allocated once only, i.e. the allocation message is sent only once per period over the transmission bus. As only new allocations are transferred in the allocation message, it cannot be used to deduct the SMF frame's utilization degree. In the SMF1 frame allocation field of the example of FIG. 11, allocation messages 'ch1; 3,9' and 'ch2; 1,12' are transmitted, which indicate to the receiving unit that transmission blocks 3 and 9 have been allocated for transfer of information of channel 1 and correspondingly transmission blocks 1 and 12 for channel 2. The subframes of these two channels are inserted into the payload field of SMF1 frame, in said transmission blocks. Subframes of other channels are inserted into the other transmission blocks of the SMF1 frame's payload field according to allocations made. The formed SMF1 frame is transmitted over the transmission bus to toe receiving unit which reads the new allocations made to the payload field from the allocation messages of the allocation field, and demultiplexes the payload field, subframes to a fixed-length transmission frame, e.g. a PCM frame, on the basis of the these new and the previous allocations, reversely from what is shown in FIG. 11. The receiving unit also generates idle TRAU speech frames for channels 3 and 4, if required by transmitting the fixed-length frames forward. The rest of the subframes of the TRAU1 and TRAU2 frames are transmitted in the subsequent SMF frames, without an allocation message in the SMF frames' allocation field.

Figure 12:
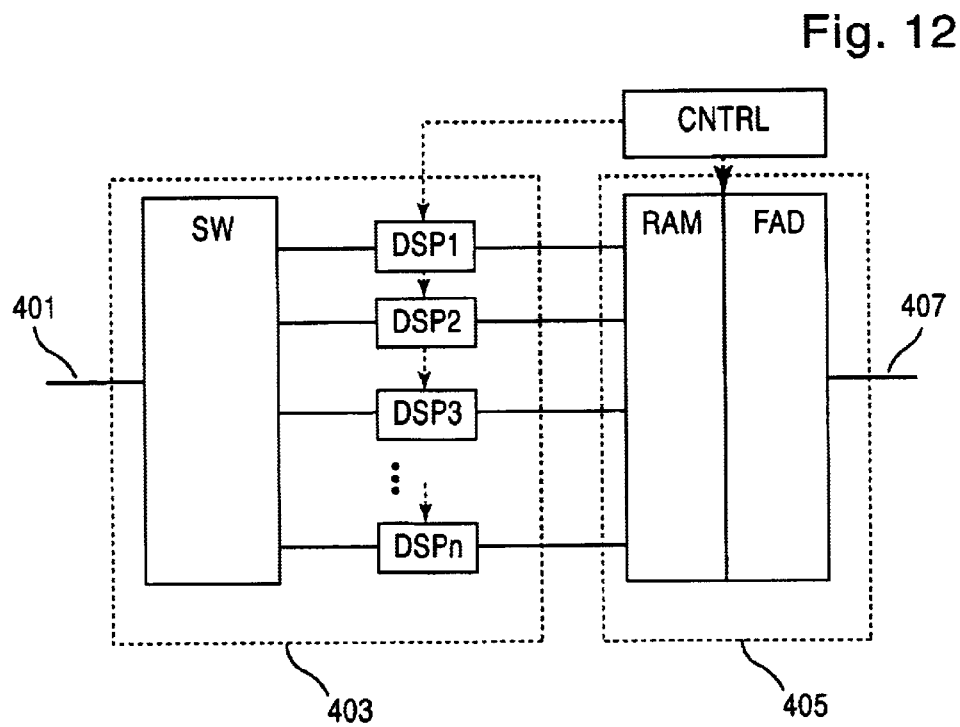
FIG. 12 shows an embodiment of the inventive statistical multiplexer as a block diagram; and, FIG. 13 shows an embodiment of the inventive statistical demultiplexer as a block diagram.

FIG. 12 shows, in block diagram form, an embodiment of the statistical multiplexer carrying out the inventive statistical multiplexing. This multiplexer comprise an interface four PCM traffic 401 a checking unit 403, a frame handling unit 405, centralized control logic CNTRL and bus connection 407 for the SMF frames transferred. The checking unit 403 further comprises a switching unit SW for e.g. 16 kbit/s channels and signal processors DSP1–DSPn assigned for the channels. The frame handling unit 405 comprises a centralized RAM unit and a frame assembling unit FAD (Frame Assembler-Disassembler). The switching unit SW connects the signals received e.g. in a G.704 frame from PCM interface 401 to the correct signal processor DSP, each channel having its own DSP. Signal processor DSP recognizes the state of its channel and the traffic transferred therein from e.g. the synchronization pattern of the TRAU frame and the signalling frame's flag. According to the invention, the DSP requests the control unit CNTRL to allocate transfer resources to the activated channel from the SMF frame. The control unit CNTRL searches for as many free blocks in the SMF frame as required by the transfer rate of the activated channel. Also, when traffic ceases on the channel, signal processor DSP informs the CNTRL of this in order for the CNTRL to be able to detect unused blocks as it is searching for space in the SMF frame. Control unit CNTRL stores all existing allocations in memory. The DSP transfers the data carried on the active channel to the RAM unit in blocks having the length T1, i.e. in subframes, which are stored in the RAM unit into an address that the control unit has allocated to the channel. If needed, data can also be buffered in the RAM unit for later transmission. The FAD unit combines these subframes that are in the RAM unit into the inventive SMF frame that is transmitted to e.g. a 2 Mbit/s bus 407, advantageously concurrently with its assembly. As traffic on the channel begins, the control unit CNTRL attaches the channels identification information, i.e. information on new allocations of the frame structure, to the allocation message of the SMF frame carrying the fist subframe of the active channel, for the receiving unit In the subsequent frames, this identification information is no longer transmitted. Once the activated channel's position has been allocated from the SMF frame, the allocation is valid until the control unit allocates the same blocks for use by another channel. Allocations are not released separately. In a normal case, a new allocation is not made before traffic on the first channel ceases, but in a congested state the active channel may temporarily lose its position in the middle of an activity period.

The centralized control logic CNTRL also supervises the multiplexer's operation. In particular, it monitors the number of subframes in the RAM unit. Consequently, congestion management can be arranged by e.g. commanding the signal processors DSP to momentarily interrupt the transfer of TRAU frames. In such a case. TRAU frames are lost in an equal manner on several channels, without totally preventing traffic on any one channel.

As the multiplexer packets the transferred data, it is possible to further enhance the transfer by incorporating data frame compression into the multiplexer, e.g. in accordance with recommendation V.42bis.

Figure 13:
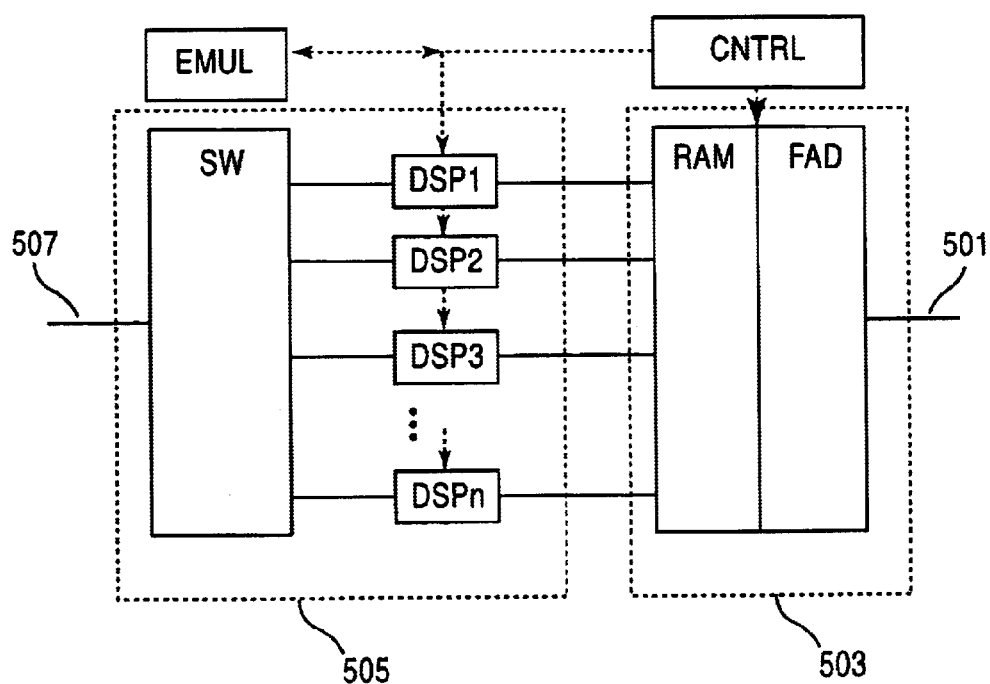

FIG. 13 shows, in block diagram form, an embodiment of the statistical multiplexer carrying out the inventive statistical multiplexing. This multiplexer comprises a bus interface 501 for the received SMF frames, a frame handling unit 503, a regular-frame assembling unit 65, centralized control logic CNTRL, a CCUFTC emulator EMUL and an interface for PCM traffic 507. The frame handling unit 503 further comprises a frame demultiplexing unit FAD (Frame Assembler-Disassembler) and a centralized RAM unit The regular frame assembling unit 505 comprises signal processor DSP1–DSPn and a switching unit SW. The control unit in the statistical demultiplexer carrying out the inventive functionality controls the disassembly of an SMF frame on the basis of allocation information transferred in the allocation messages. The SMF frame received from bus interface 501 is demultiplexed in the FAD unit based on the allocation information of control unit CNTRL, and each channel's subframe is transferred to the RAM unit to the correct address. The subframes of the channels are transferred from the RAM unit to signal processor DSP allocated to each channel. CCU/TC emulator EMUL generates the bit stream required by transcoder TC and channel coding unit CCU onto the active channels during speech pauses when no idle data has been transferred on the bus, according to the invention. In such a case, emulator EMUL generates e.g. idle TRAU speech frames, during which the transmitting unit does not transmit bit streams on the quiet channel. Emulator EMUL generates, if need be, also the extra management bits, such as synchronization and/or control bits, removed in the transmitting unit The bit streams are inserted through the switching unit SW into the correct timeslot of e.g. a PCM frame and transmitted forward via Interface 507.

The inventive statistical multiplexer and demultiplexer can be integrated, in which case some of the units shows in FIGS. 12 and 13 may be common. The statistical multiplexer and demultiplexer may also be integrated in a network element.

As regards the traffic transferred in the network, the inventive statistical multiplexing is transparent. The inventive SMF frame may be transferred over e.g. ATM (Asynchronous Transfer Mode), because the frame is transparent to the network.

The statistical multiplexer and bus may be dimensioned according to the average data amount transferred on the channel. The transmission line between the statistical multiplexer and demultiplexer is thus dimensioned smaller than the maximum traffic load. The highest transfer capacity saving is achieved when the base station connections are of low capacity and there is a plurality of them. Further, statistical multiplexing provides the biggest advantage in a case where the data transferred on the channels consists of bursts, i.e. when ts momentary bandwidth requirement is considerably higher than the average data rate.

The figures and the related description are only intended to illustrate the idea of the invention. The inventive multiplexing may vary in details within the scope of the claims.

Although the invention is in the above described mainly in connection with the GSM system, the method is generally applicable for use in telecommunications networks. The invention is particularly well suited for speech transfer in telephone traffic, but it may also be employed for transfer of other type of information, such as data transfer.

What is claimed is:

1. A method for carrying out statistical multiplexing in a telecommunications network which comprises a transmitting unit for transferring channels containing information from at least two traffic sources, a receiving unit and a transmission link between the at least two traffic sources, the information to be transmitted in the telecommunication system being transferred over the transmission link in transmission frames, the method comprising:
assembling a variable-length transmission frame which comprises an allocation field and an information field,
identifying an active channel of channels from a plurality of traffic sources,
allocating an information field transmission block from the variable-length transmission frame to the information of the active channel to be transferred,
inserting the information of the active channel to be transferred into the allocated transmission block,
adding channel allocation information into an allocation field of the variable-length transmission frame in which the information of the active channel is for a first time continuous transfer,
maintaining the channel allocation for as long as a channel in question is continuously active, and
transmitting said variable-length transmission frame from the transmitting unit to the receiving unit over the transmission link.

2. A method as claimed in claim 1, further comprising:
inserting, in the transmitting unit, the information of the active channel to be transferred from a structurally regular fixed-length frame into said variable-length transmission frame, into a data transfer block allocated for use by the channel in question, and
transferring, in the receiving unit, the information of the active channel from the transmission block of the variable-length transmission frame to the structurally regular fixed-length frame.

3. A method as claimed in claim 1 in a telecommunications network which employs a discontinuous transmission feature in at least part of the traffic sources, further comprising:
distinguishing payload information and unnecessary bit stream on at least one channel of a traffic source,
inserting the payload only into the information field of the variable-length transmission frame.

4. A method as claimed in claim 3, wherein the unnecessary bit stream is generated among the payload in the receiving unit.

5. A method as claimed in claim 1, further comprising:
identifying traffic activity on channels of a plurality of traffic sources, and
inserting information of active channels into the information field of the variable-length transmission frame.

6. A method as claimed in claim 1, further comprising the steps of:
removing spare management bits from the information of the active channel to be transferred,
inserting the remaining bits into the transmission block allocated to the active channel, and
generating the removed spare management bits in the receiving unit.

7. A method as claimed in claim 6, wherein at least one synchronization bit is removed.

8. A method as claimed in claim 6, wherein at least one control bit is removed.

9. A method as claimed in claim 1, further comprising:
assembling a variable-length transmission frame prior to transmitting the variable-length transmission frame to the transmission link.

10. A method as claimed in claim 1, further comprising:
assembling a variable-length transmission frame having a fixed length allocation field.

11. A method as claimed in claim 10, further comprising:
protecting the allocation field to detect transmission errors, and
retransmitting information of an erroneous allocation field in the allocation field of a new transmission frame.

12. A statistical multiplexer to multiplex information of a plurality of channels in a telecommunications network, the multiplexer comprising an interface for receiving traffic transferred in a fixed length frame, wherein the statistical multiplexer further comprises:
a checking unit for identifying an active channel of channels from a plurality of traffic sources,
a frame handling unit for assembling a variable-length transmission frame comprising an allocation field and an information field,
centralized control logic for controlling a functionality of the checking unit and the frame handling unit, for handling the allocation field of the variable-length transmission frame, for storing existing allocations in memory, and for maintaining channel allocation for as long as a channel in question is continuously active, and
an interface for transferring the variable-length transmission frames.

13. A statistical multiplexer as claimed in claim 12, wherein the checking unit comprises:
a switching unit for switching fixed length frames of single channels, and
signal processors for identifying active periods of at least one channel.

14. A statistical multiplexer as claimed in claim 12, wherein the frame handling unit further comprises:
a memory unit for buffering information of active channels, and
a frame assembling unit for inserting information into a variable-length transmission frame.

15. A statistical multiplexer as claimed in claim 12, wherein the centralized control logic is adapted to allocate transmission blocks of the variable-length transmission frame and to incorporate an allocation into said variable-length transmission frame.

16. A statistical demultiplexer for disassembling multiplexed information of a plurality of channels in a telecommunications network, the demultiplexer comprising an interface for transferring fixed-length frames, the statistical demultiplexer further comprises:
an interface for receiving variable-length transmission frames,
a frame handling unit for disassembling the variable-length transmission frames comprising an allocation field and an information field,
a regular frame assembling unit for assembling fixed-length frames, and centralized control logic for controlling a functionality of the frame handling unit and the regular frame assembling unit, and for maintaining channel allocation for as long as a channel in question is continuously active.

17. A statistical demultiplexer as claimed in claim 16, wherein the demultiplexer further comprises an emulator for generating bits among information received in the variable-length transmission frame.

18. A statistical demultiplexer as claimed in claim 16, wherein the frame handling unit comprises:

frame disassembling unit for disassembling information from the variable-length transmission frame, and a memory unit for buffering the demultiplexed information.

19. A statistical demultiplexer as claimed in claim 16, wherein the regular frame assembling unit comprises:

signal processors for processing the bit stream of each channel, and a switching unit for inserting single channels into the fixed-length frames.

20. A statistical demultiplexer as claimed in claim 16, wherein the centralized control logic is adapted to manage allocations of transmission blocks of the variable-length transmission frame, and to control an information disassembly from said variable-length transmission frame according to the allocations.

* * * * *